US008194576B2

(12) United States Patent
Kholaif et al.

(10) Patent No.: US 8,194,576 B2
(45) Date of Patent: Jun. 5, 2012

(54) WIRELESS ACCESS POINT METHODS AND APPARATUS USING DYNAMICALLY-ACTIVATED SERVICE INTERVALS

(75) Inventors: Ahmad Mohammad Kholaif, Waterloo (CA); Mohammed N. Smadi, Ancasler (CA); Polychronis Koutsakis, Chania (GR); Terence Douglas Todd, Hamilton (CA)

(73) Assignee: Research In Motion Limited, Waterloo, Ontario (CA)

( * ) Notice: Subject to any disclaimer, the term of this patent is extended or adjusted under 35 U.S.C. 154(b) by 532 days.

(21) Appl. No.: 12/412,591

(22) Filed: Mar. 27, 2009

(65) Prior Publication Data

US 2010/0246460 A1    Sep. 30, 2010

(51) Int. Cl.
*H04B 7/00* (2006.01)
(52) U.S. Cl. ........................................ 370/310
(58) Field of Classification Search .......... 370/310–340, 370/431–463
See application file for complete search history.

(56) References Cited

U.S. PATENT DOCUMENTS

| | | | |
|---|---|---|---|
| 5,940,771 | A | 8/1999 | Gollnick et al. |
| 7,436,790 | B2 | 10/2008 | Todd et al. |
| 7,477,616 | B2 | 1/2009 | Wang et al. |
| 2004/0023679 | A1 | 2/2004 | Shoobridge |
| 2004/0253996 | A1* | 12/2004 | Chen et al. ............ 455/574 |
| 2005/0002420 | A1 | 1/2005 | Jeanne et al. |
| 2005/0047357 | A1 | 3/2005 | Benveniste |
| 2005/0070340 | A1* | 3/2005 | Kim ....................... 455/574 |
| 2005/0190731 | A1* | 9/2005 | Bejerano et al. ....... 370/338 |
| 2007/0041353 | A1 | 2/2007 | Li et al. |
| 2007/0058588 | A1 | 3/2007 | Fashandi et al. |
| 2007/0291732 | A1* | 12/2007 | Todd et al. ............ 370/351 |
| 2007/0297357 | A1 | 12/2007 | Todd et al. |
| 2008/0043656 | A1* | 2/2008 | Yoon et al. ............ 370/311 |
| 2008/0261663 | A1* | 10/2008 | Park et al. ............ 455/574 |

OTHER PUBLICATIONS

Kholaif et al., "QoS-Enabled Power Saving Access Points for IEEE 802.11e Networks", IEEE, 2008.
Zhang et al, "Power Saving Access Points for IEEE 802.11 Wireless Network Infrastructure", IEEE Transaction on Mobile Computing, vol. 5, No. 2, Feb. 2006.
Woesner et al, Power-Saving Mechanisms in Emerging Standards for Wireless LANs: The MAC Level Perspective, IEEE Personal Communications, Jun. 1998.
Chen et al, A Comparison of MAC Protocols for Wireless Local Networks Based on Battery Power Consumption, IEEE document, 1998.

(Continued)

*Primary Examiner* — Chi Pham
*Assistant Examiner* — Fan Ng
(74) *Attorney, Agent, or Firm* — John J. Oskorep, Esq.

(57) ABSTRACT

Methods and apparatus for controlling a wireless access point (AP) (e.g. a battery-powered wireless AP) for reduced power consumption are provided. In one illustrative example, the AP is adapted to provide communication access for end stations in one or more activated service intervals of each superframe. During operation, the AP changes the number of activated service intervals that are available to end stations for the communication access, as well as the durations of their active subinterval durations, in accordance with a change in traffic requirements. The AP regularly broadcasts data which indicates the activated service intervals that are made available to the mobile devices. A wireless transceiver of the AP is enabled during each activated service interval made available to the mobile devices, but the AP is placed in a power conservation mode during each deactivated service interval provided in between the activated service intervals. The AP may also be placed in the power conservation mode during inactive subintervals of each activated service interval.

19 Claims, 9 Drawing Sheets

OTHER PUBLICATIONS

Tseng et al, Power-Saving Protocols for IEEE 802.11-Based Multi-Hop Ad Hoc Networks, IEEE document, 2002.

Non-Final Office Action of U.S. Appl. No. 11/464,535, Feb. 18, 2009.

* cited by examiner

1200

1300

WIRELESS ACCESS POINT METHODS AND APPARATUS USING DYNAMICALLY-ACTIVATED SERVICE INTERVALS

BACKGROUND

1. Field of the Technology

The present disclosure relates generally to wireless communication networks and devices, such as IEEE 802.11 wireless local area networks (WLANs) and devices.

2. Description of the Related Art

Institute of Electrical and Electronics Engineers (IEEE) 802.11 Wireless Local Area Network (WLAN) compliant devices, such as 802.11a, 802.11b, 802.11e, 802.11g, dual-band, etc. devices, are becoming increasingly popular. Such IEEE 802.11-based WLANs are undergoing a massive deployment which will continue over the years. Locations that offer IEEE 802.11 WLAN connectivity are often referred to as "hotspots," where wireless access points (APs) are utilized to provide wireless connections with communication devices, such as mobile communication devices.

In these environments, Extended Service Set (ESS) mesh networking may provide the AP interconnection needed to backhaul traffic in and out of these hotspots and perform mesh-like traffic relaying. Wireless APs that are battery-powered, solar-powered, wind-turbine-powered, or powered by any other sustainable energy source are becoming a reality in these environments as well. Thus, an IEEE 802.11 WLAN solution which accommodates ESS mesh networks and is applicable to such battery-powered APs would be useful.

What are needed are techniques which may be used in IEEE 802.11 WLANs, or other similarly-situated wireless networks, to enable wireless APs to reduce their power consumption (i.e. achieve improved power savings).

DETAILED DESCRIPTION OF THE PREFERRED EMBODIMENTS

Figure 1:
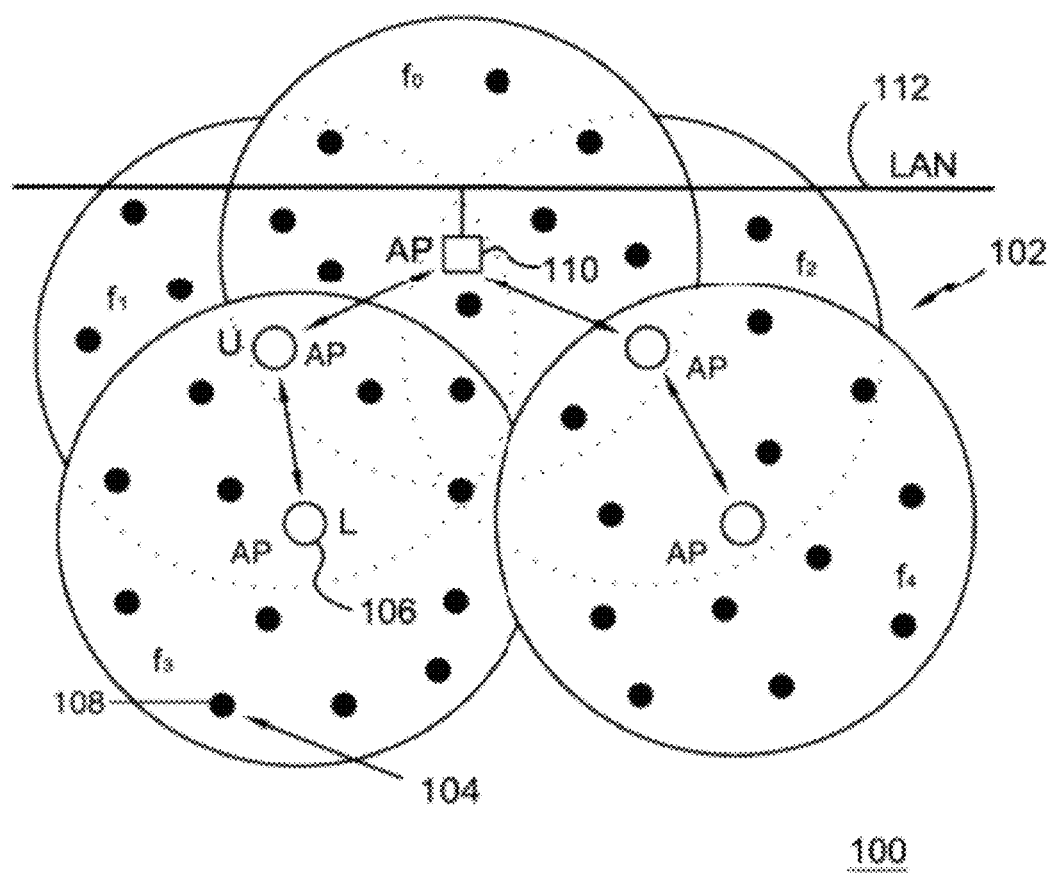
FIG. 1 is a top down illustrative representation of the structure of a wireless communication network or an IEEE 802.11-based wireless local area network (WLAN) having wireless access points (APs) of the present disclosure.

In the past decade, there has been a proliferation of wireless local area networks (WLANs) operative in accordance with Institute of Electrical and Electronics Engineers (IEEE) 802.11 standards. As IEEE 802.11 connectivity becomes more ubiquitous, multi-hop communications will be increasingly utilized for range extension and coverage enhancement.

In WLAN mesh networks, wired power connections may not always be readily available, especially in installations which cover expansive outdoor areas. In such cases, fixed power connections can often be replaced by battery-powered, solar-powered, wind turbine-powered, or other sustainable energy designs. These types of wireless APs have many practical applications and can be deployed inexpensively and very quickly to provide both outdoor and indoor coverage enhancement in environments such as campuses, building complexes, and other fast deployment scenarios. It has been shown that reducing mesh node power consumption can lead to significant cost savings and, for this reason, power saving on the AP would be highly desirable. Thus, power savings in APs is an important objective.

Note that power savings in client stations is strongly supported in the standards (e.g. Power Save Mode (PSM) in IEEE 802.11b, Automatic Power Saving Delivery (APSD) in IEEE 802.11e, and Power Save Mode Poll (PSMP) in IEEE 802.11n). However, conventional IEEE 802.11 APs are required to be continuously active, which defeats or discourages AP power savings techniques. In one recently-proposed AP technique, protocols for achieving some power savings while accommodating legacy end stations was devised. Unfortunately, the procedures may have practical disadvantages, primarily due to IEEE 802.11's requirement that each AP always remain active on its assigned channel. This restriction is an impediment to the development of practical power saving infrastructure. In another recent approach, the network allocation vector (NAV) mechanism of the IEEE 802.11 is exploited in connection with a dynamic scheme for updating the sizes of sleep and awake periods based on a network allocation map (NAM). However, this scheme only considers best-effort traffic with no Quality of Service (QoS) guarantees.

What are needed are techniques that can be used by QoS-enabled APs of IEEE 802.11 WLANs to significantly reduce their power consumption (i.e. achieve improved power savings). To date, significant achievements have not been made, as existing IEEE 802.11 standards require that APs remain active at all times.

Advantageously, the QoS-enabled AP of the present disclosure operates with reduced power consumption while preserving the QoS requirements for delay and loss-intolerant real-time applications. Analysis has shown that power consumption of such APs may be significantly reduced without violating any of the QoS requirements for real-time traffic streams. The effect on power savings at the end stations is also reasonable and can be controlled via protocol-specific parameters.

As described herein, methods and apparatus are provided for controlling a wireless access point (AP) (e.g. a battery-powered wireless AP) for reduced power consumption. The AP is adapted to provide communication access for mobile communication devices in one or more service intervals of a superframe. In IEEE 802.11e, the communication access may be or include contention-based access or polling-based access such as an Enhanced Distributed Channel Access (EDCA) or a Hybrid Coordinator Function (HCF) Controlled Channel Access (HCCA), respectively. During operation, the AP changes the number of activated service intervals, and the durations of active subintervals therein, that are available to end stations for the communication access in accordance with a change in traffic requirements. The AP regularly broadcasts data indicative of the activated service intervals that are made available to the end stations. A wireless transceiver of the AP is enabled during each activated service interval made available to the end stations, but disabled during each power conservation interval provided in between the activated service intervals in order to reduce power consumption.

More particularly, the wireless AP of the present disclosure may operate with use of an energy-efficient media access control (MAC) protocol. The present scheme utilizes the dynamic activation and de-activation of one or more service intervals (SIs) in each superframe. Each superframe is defined by the interval or boundaries between consecutive beacon frames, and is divided into a plurality of SIs having boundaries that may be fixed. Intervals between the "activated" service intervals may be referred to as "deactivated" service intervals, non-service intervals, or power conservation intervals. The AP regularly identifies the traffic requirement for the end stations associated therewith, and adjusts the number of activated SIs in accordance with the traffic requirement. The AP may also change a duration of an active subinterval within a given activated service interval in accordance with the traffic requirement. The AP places itself into a power conservation mode during deactivated service intervals, and may further place itself into the power conservation mode during inactive subintervals of each activated service interval.

The identification of the traffic requirement may be or include identification of the QoS requirement or expectations for the one or more end stations. In one embodiment, the AP may receive and examine data in Traffic Specifications (TSPECs) from the end stations to identify or determine the traffic requirement. Each TSPEC may contain a set of parameters, characteristics, or QoS expectations of the traffic stream, or combinations of the above. When real-time traffic flows are present, the AP schedules its awakening/sleeping pattern in a manner that satisfies the delay and packet loss requirements for admitted flows for the end stations. To help achieve these underlying objectives, such technique utilizes an Unscheduled (US) Automatic Power Save Delivery (APSD) (US-APSD) mechanism of IEEE 802.11.

The AP transmits, to the end stations, data which indicates the current/updated activated service intervals in the superframe that are made available to the end stations for communications. The data which indicate the service intervals may do so directly by listing the service intervals by identifiers associated with the service intervals, by duration or boundary indications of the activated service intervals and/or their associated active subintervals, or both, or by other suitable indications. On the other hand, the data which indicate the service internals may do so indirectly by listing the deactivated (power conservation) service intervals by identifiers, or duration or boundary indications of the deactivated service intervals, or both, or by other suitable indications.

In one embodiment, the AP may regularly broadcast or advertise these data to the end stations (e.g. these data may be regularly broadcasted in each beacon frame). In particular, the protocol may make use of a Network Allocation Map (NAM), communicating to the end stations a simple layout or indication of the available SIs in the AP's current superframe (i.e. those one or more service intervals in the superframe which immediately follow the beacon). The NAM may contain the start and end times of each SI, for example. Thus, the AP may include a NAM field in its transmissions or broadcasts to coordinate traffic delivery and power saving at both the AP and the end stations. End stations in the basic service set (BSS) that receive these data operate to learn the current set of active SIs as advertised in the NAM. During power conservation modes of the AP, all end stations may block their Network Allocation Vectors (NAVs) and refrain from accessing the channel until the NAV is reset at the beginning of the next activated service interval.

To illustrate the exemplary environment in FIG. 1, an IEEE 802.11 WLAN of a communication system 100 is shown as providing a conventional AP 110 with a wired infrastructure connection 112 to a local area network (LAN) and to the Internet. A plurality of wireless APs 102 of the present disclosure, such as an AP 106, have also been installed in communication system 100. These APs 102 serve to provide coverage extension and/or interconnection in their respective wireless coverage areas. Although four APs 102 are shown in the drawing, any suitable number of APs may be configured in the network. APs 102 are adapted to perform dual channel multihop relaying and, at the same time, accommodate IEEE 802.11 end stations 104. APs 102 are also adapted to associate with a conventional IEEE 802.11-based wired AP 110. APs 102 may operate using limited power reserves, as is the case for battery-powered, solar-powered, wind-turbine-powered, or other sustainable energy powered APs.

Figure 2:
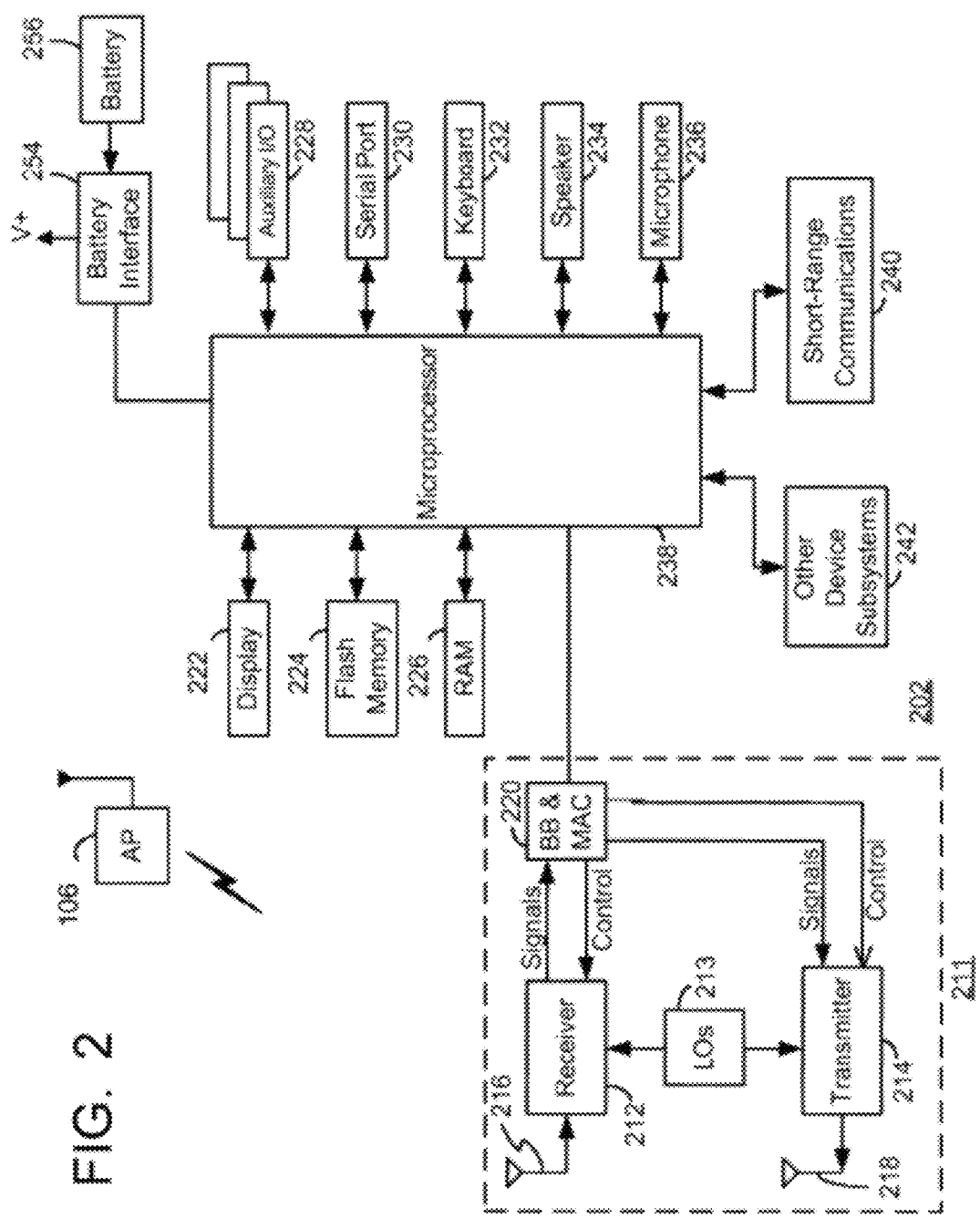
FIG. 2 is an exemplary schematic block diagram of a communication device (e.g. a mobile communication device) which operates in the WLAN of FIG. 1.

Referring now to FIG. 2, electrical components of a typical end station 202 (one type of mobile communication device) which operates with APs 102 of the present disclosure (FIGS. 1 and 3) will be described. Note that APs may communicate with any suitable communication device, which may not necessarily be mobile. End station 202 is preferably a two-way communication device having at least voice and advanced data communication capabilities. Data communications are achieved through use of data packet communications, and the voice communications may be achieved through use of Voice over IP (VoIP). Depending on the functionality provided by end station 202, it may be referred to as a data messaging device, a two-way pager, a cellular telephone with data messaging capabilities, a wireless Internet appliance, or a data communication device (with or without telephony capabilities).

As shown in FIG. 2, end station 202 is adapted to wirelessly communicate with AP 106. For communication with AP 106, end station 202 utilizes communication subsystem 211.

Depending on the type of device, end station 202 may also be adapted to wirelessly communicate with other systems such as cellular telecommunication systems. With such configuration, end station 202 may be referred to as a "dual mode" end station. Although end station 202 may have separate and independent subsystems for these purposes, at least some portions or components of these otherwise different subsystems may be shared where possible.

Communication subsystem 211 includes a receiver 212, a transmitter 214, and associated components, such as one or more (preferably embedded or internal) antenna elements 216 and 218, local oscillators (LOs) 213, and a processing module such as a baseband (BB) and media access control (MAC) processing module 220. As will be apparent to those skilled in the field of communications, the particular design of communication subsystem 211 depends on the communication network in which end station 202 is intended to operate. In the present disclosure, communication subsystem 211 (including its associated processor/processing components) are operative in accordance with IEEE 802.11 standards.

End station 202 may send and receive communication signals through the network after required network procedures have been completed. Signals received by antenna 216 through the network are input to receiver 212, which may perform such common receiver functions as signal amplification, frequency down conversion, filtering, channel selection, and like, and in example shown in FIG. 2, analog-to-digital (A/D) conversion. A/D conversion of a received signal allows more complex communication functions such as demodulation and decoding to be performed in BB/MAC processing module 220. In a similar manner, signals to be transmitted are processed, including modulation and encoding, for example, by BB/MAC processing module 220. These processed signals are input to transmitter 214 for digital-to-analog (D/A) conversion, frequency up conversion, filtering, amplification and transmission through the network via antenna 218. BB/MAC processing module 220 not only processes communication signals, but may also provide for receiver and transmitter control. Note that receiver 212 and transmitter 214 may share one or more antennas through an antenna switch (not shown in FIG. 2), instead of having two separate dedicated antennas 216 and 218 as shown.

Since end station 202 is a portable battery-powered device, it also includes a battery interface 254 for receiving one or more rechargeable batteries 256. Such a battery 256 provides electrical power to most if not all electrical circuitry in end station 202, and battery interface 254 provides for a mechanical and electrical connection for it. Battery interface 254 is coupled to a regulator (not shown in FIG. 2) that provides power V+ to all of the circuitry.

End station 202 includes a microprocessor 238 (one type of processor or controller) that controls overall operation of end station 202. This control includes the communication and operational techniques of the present disclosure. Communication functions, including at least data and voice communications, are performed through communication subsystem 211. Microprocessor 238 also interacts with additional device subsystems such as a display 222, a flash memory 224, a random access memory (RAM) 226, auxiliary input/output (I/O) subsystems 228, a serial port 230, a keyboard 232, a speaker 234, a microphone 236, a short-range communications subsystem 240, and any other device subsystems generally designated at 242. Some of the subsystems shown in FIG. 2 perform communication-related functions, whereas other subsystems may provide "resident" or on-device functions. Notably, some subsystems, such as keyboard 232 and display 222, for example, may be used for both communication-related functions, such as entering a text message for transmission over a communication network, and device-resident functions such as a calculator or task list. Operating system software used by microprocessor 238 may be stored in a persistent store such as flash memory 224, which may alternatively be a read-only memory (ROM) or similar storage element (not shown). Those skilled in the art will appreciate that the operating system, specific device applications, or parts thereof, may be temporarily loaded into a volatile store such as RAM 226.

Microprocessor 238, in addition to its operating system functions, preferably enables execution of software applications on end station 202. A predetermined set of applications that control basic device operations, including at least data and voice communication applications, will normally be installed on end station 202 during its manufacture.

One application that may be loaded onto end station 202 may be a personal information manager (PIM) application having the ability to organize and manage data items relating to user such as, but not limited to, e-mail, calendar events, voice mails, appointments, and task items. Naturally, one or more memory stores are available on end station 202 and SIM 256 to facilitate storage of PIM data items and other information. The PIM application has the ability to send and receive data items, via the wireless network, which may be achieved through use of data packet communications. PIM data items are seamlessly integrated, synchronized, and updated via the wireless network, with the wireless device user's corresponding data items stored and/or associated with a host computer system thereby creating a mirrored host computer on end station 202 with respect to such items. This is especially advantageous where the host computer system is the wireless device user's office computer system. Additional applications may also be loaded onto end station 202 through network, an auxiliary I/O subsystem 228, serial port 230, short-range communications subsystem 240, or any other suitable subsystem 242, and installed by a user in RAM 226 or preferably a non-volatile store (not shown) for execution by microprocessor 238. Such flexibility in application installation increases the functionality of end station 202 and may provide enhanced on-device functions, communication-related functions, or both. For example, secure communication applications may enable electronic commerce functions and other such financial transactions to be performed using end station 202.

In a data communication mode, a received signal having user data for a text message, an e-mail message, or web page download (e.g. data being included in data packets) may be processed by communication subsystem 211 and input to microprocessor 238. Microprocessor 238 may further process the signal for output to display 222 or alternatively to auxiliary I/O device 228. A user of end station 202 may also compose data items, such as e-mail messages, for example, using keyboard 232 in conjunction with display 222 and possibly auxiliary I/O device 228. Keyboard 232 is preferably a complete alphanumeric keyboard and/or telephone-type keypad. These composed items may be transmitted over a communication network through communication subsystem 211.

For voice communications (e.g. VoIP), the overall operation of end station 202 is substantially similar, except that the received signals would be output to speaker 234 and signals for transmission would be generated by microphone 236. Alternative voice or audio I/O subsystems, such as a voice message recording subsystem, may also be implemented on end station 202. Although voice or audio signal output is preferably accomplished primarily through speaker 234, display 222 may also be used to provide an indication of the identity of a calling party, duration of a voice call, or other voice call related information, as some examples.

Serial port 230 in FIG. 2 is normally implemented in a personal digital assistant (PDA)-type communication device for which synchronization with a user's desktop computer is a desirable, albeit optional, component. Serial port 230 enables a user to set preferences through an external device or software application and extends the capabilities of end station 202 by providing for information or software downloads to end station 202 other than through a wireless communication network. The alternate download path may, for example, be used to load an encryption key onto end station 202 through a direct and thus reliable and trusted connection to thereby provide secure device communication. Short-range communications subsystem 240 of FIG. 2 is an additional optional component that provides for communication between end station 202 and different systems or devices, which need not necessarily be similar devices. For example, subsystem 240 may include an infrared device and associated circuits and components, or a Bluetooth™ communication module to provide for communication with similarly enabled systems and devices. Bluetooth™ is a registered trademark of Bluetooth SIG, Inc.

Figure 3:
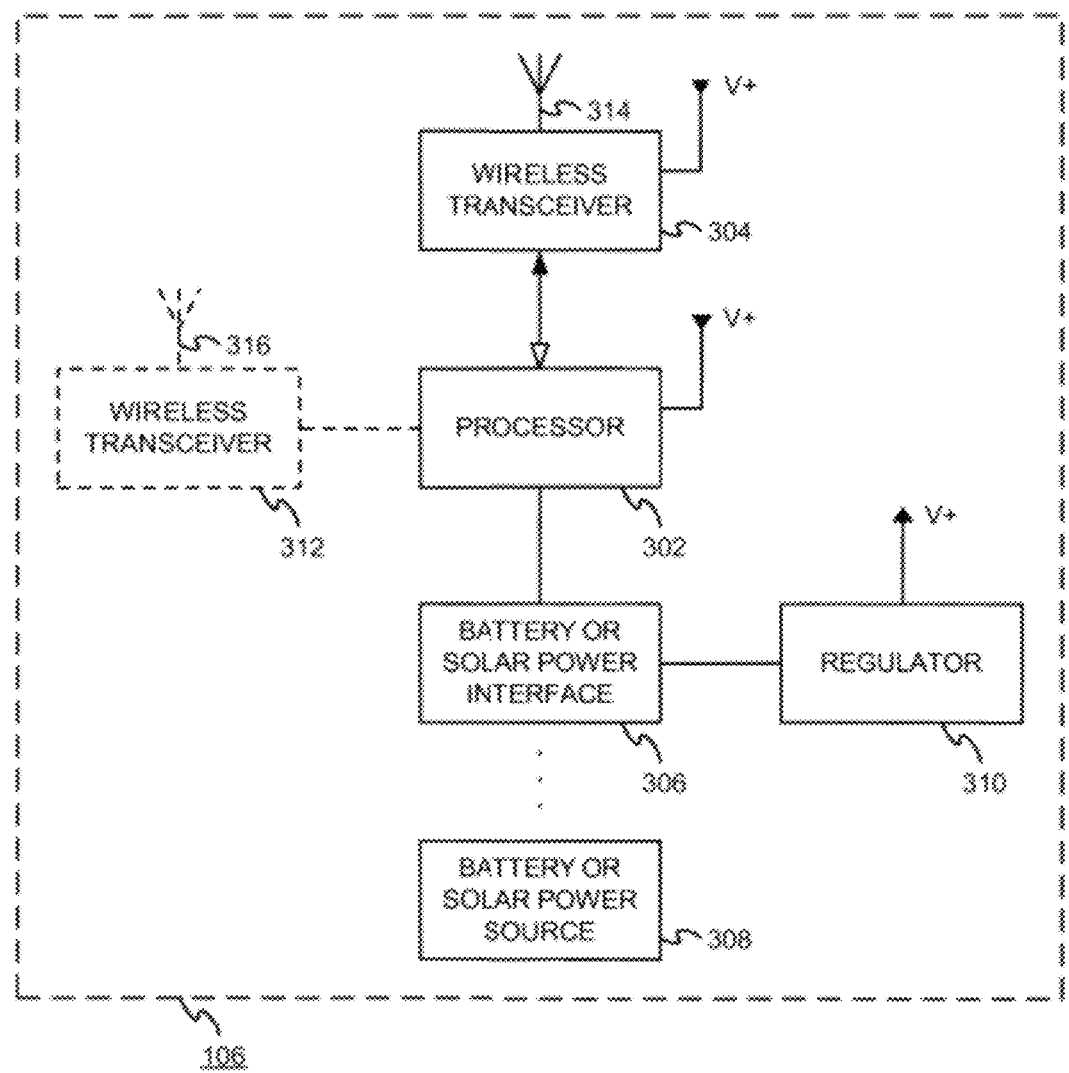
FIG. 3 is an exemplary schematic block diagram of a wireless AP which operates in the WLAN of FIG. 1.

Referring now to FIG. 3, electrical components of a typical wireless AP (e.g. wireless AP 106 of FIGS. 1 and 2) of the present disclosure will be described. AP 106 of the present disclosure includes one or more processors 302 (e.g. including a microprocessor), a wireless transceiver 304 for communicating information for a plurality of end stations, an antenna 314 coupled to wireless transceiver 304, a battery or solar power interface 306 (i.e. one example of a sustainable energy interface), a regulator 310 coupled to the battery or solar power interface 306, and a battery or solar power source 308. Regulator 310 produces a regulated voltage V+ for the other electrical components within AP 106, being supplied electrical power through battery/solar power interface 306 from battery/solar power source 308. Most if not all components of AP 106 (except perhaps for battery/solar power source 308) may be carried and/or contained within a housing of AP 106. In this example, AP 106 operates in accordance with IEEE 802.11 standards (e.g. compatible with IEEE 802.11e, in addition to providing the techniques of the present disclosure. AP 106 also operates utilizing Extended Service Set (ESS) mesh networking techniques.

AP 106 may be portable in nature which is made possible with battery power interface 306. AP 106 may be configured with an ESS mesh employing IEEE 802.11 operation, as well as being adapted for battery powered operation. When portable in nature, AP 106 may be positioned and setup in any suitable area or environment and, as examples, AP 106 may be found in areas around coffee shops, restaurants, hotels, airports, and company offices. Areas within which AP 106 provides coverage may be referred to as a "hot spot". End stations communicate wirelessly within and through AP 106 through radio frequency (RF) communication links. AP 106 may communicate with other APs (e.g. other APs or wired APs as in FIG. 1). The wired APs are typically wire-connected to the Internet using traditional Telco connections to provide higher bandwidth data communications.

In one embodiment, AP 106 includes a single radio interface having wireless transceiver 304 and antenna 314. Thus, wireless transceiver 304 is utilized to communicate with both end stations and other APs as will be described herein. Alternatively, AP 106 may include wireless transceiver 304 and antenna 314 for communicating with the end stations and one or more additional wireless transceivers 312 and antennas 316 (both shown in dashed lines) for communicating with other APs. Wireless transceiver 304 and other components of AP 106 (e.g. at least portions of processor 302) may be powered down in a power conservation mode of operation at appropriate time periods, which will also be described herein. AP 106 has a more specific operation as will be described earlier above as well as in relation to FIGS. 4-13 below.

Referring back to FIG. 1, a specific example of AP operation is now discussed although different techniques and configurations may be utilized. In order to reduce cost and power consumption, each AP 102 utilizes a single IEEE 802.11 wireless interface in the preferred embodiment. However, two or more wireless interfaces may be utilized in the AP in other embodiments. Any communication interface may be utilized with APs 102 so long as they can efficiently relay traffic and/or desirable power saving performance. Each AP 102 may provide a HOME channel (or H channel) and acts as an AP to those end stations 104, such as end station 108, within its coverage range (shown as coverage circles in the figure). AP 106, which is labelled "L" in FIG. 1, for example, uses an H channel of frequency $f_3$. In addition, each AP 102 has a RELAY channel (or R channel) which it uses to forward/download traffic to/from its parent AP 110 or AP 102. In FIG. 1, the R channel for AP 106 utilizes a frequency $f_1$. Each frequency of the R and H channel frequencies are shown to be different in FIG. 1 ($f_0$, $f_1$, $f_2$, $f_3$, and $f_4$), which may or may not be realizable depending upon the details of the site design and the version of IEEE 802.11 being adhered to. When this is the case, the channels may be reused subject to well-understood performance limitations.

The AP of the present disclosure may be an IEEE 802.11e compatible QoS-enabled AP ("QAP") which employs a scheme for the dynamic activation and deactivation of one or more service intervals (SIs) in each superframe. Each superframe is defined by a plurality of SIs having boundaries that may be fixed. Intervals between the "activated" service intervals may be or be referred to as "deactivated" service intervals, non-service intervals, or power conservation intervals. The AP regularly identifies the traffic requirement for the end stations associated therewith, and adjusts the number of activated SIs in accordance with the traffic requirement. The AP may also change a duration of an active subinterval within a given activated service interval in accordance with the traffic requirement. Advantageously, the AP places itself into a power conservation mode during deactivated service intervals, and may further place itself into the power conservation mode during inactive subintervals of each activated service interval.

In one embodiment, the AP may receive and examine a Traffic Specification (TSPEC) from end stations, which contains a set of parameters that define the characteristics of the traffic stream (for example, operating requirement and scheduling, etc.). When real-time traffic flows are present, the AP schedules its awakening/sleeping pattern in a manner that satisfies the delay and packet loss requirements for admitted flows for the end stations.

The AP transmits, to the end stations, data which indicates the current/updated activated service intervals in the superframe (as well as the durations/boundaries of their active subintervals) that are made available to the end stations for communications. The data which indicate the activated service intervals may do so directly by listing the activated service intervals by identifiers associated with the activated service intervals, by duration or boundary indications of the service intervals or active subintervals, or both, or by other suitable indications. On the other hand, the data which indicate the activated service intervals may do so indirectly by listing the deactivated (power conservation) service intervals by identifiers, or duration or boundary indications, or both, or by other suitable indications.

In one embodiment, the AP may regularly broadcast or advertise these data to the end stations (e.g. these data may be regularly broadcasted in each beacon frame). In particular, the protocol may make use of a Network Allocation Map (NAM), communicating to the end stations a simple layout or indication of the available activated SIs in the AP's current superframe (i.e. those one or more superframes which immediately follow the beacon). Thus, the AP may include a NAM field in its transmissions or broadcasts to coordinate traffic delivery and power saving at both the AP and the end stations. End stations in the basic service set (BSS) that receive these data operate to learn the current set of activated SIs as advertised in the NAM. During power conservation modes of the AP, all end stations block their Network Allocation Vectors (NAVs) and refrain from accessing the channel until the NAV is reset at the beginning of the next activated service interval.

Figure 4:
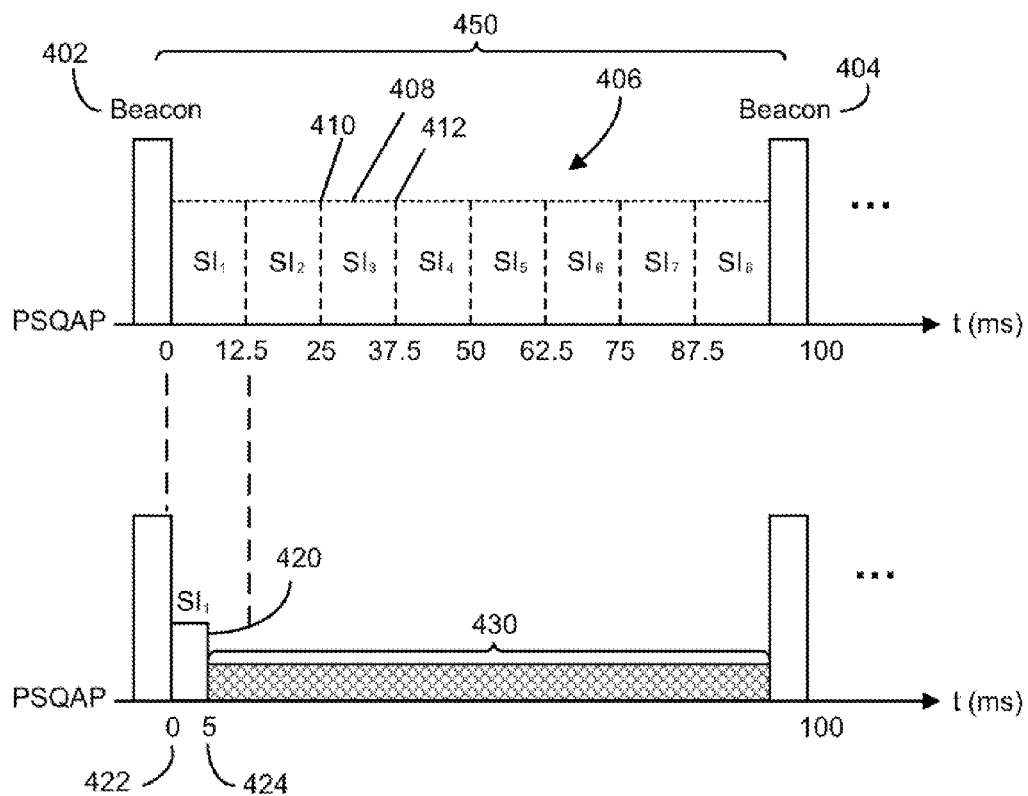
FIG. 4 is an illustrative representation of a superframe of the AP which provides a single (initial) activated service interval with an active subinterval and inactive subinterval.

Referring now to a timeline 400 of FIG. 4, a superframe 450 is divided into a plurality of N service intervals (SIs) 406, some of which may be activated/deactivated by the AP depending on the detected traffic requirement. The value of N determines the service interval length ($t_{SI}$) and the minimum delay bound for real-time traffic streams that can be met by the AP. Superframe 450 of FIG. 4 also includes or is associated with a beacon frame 402. Since the framework shown is continually repeated, another beacon frame 404 associated with the next superframe (not visible in the figures) follows superframe 450, and this next superframe has the same format as superframe 450.

To illustrate further with reference to the top portion of FIG. 4, superframe 450 is divided into a plurality of eight (8) equal service intervals 406 (i.e. N=8). The service intervals 406 may be designated or assigned by the AP as $SI_1$, $SI_2$, $SI_3$, $SI_4$, $SI_5$, $SI_6$, $SI_7$, and $SI_8$ in temporal order (left-to-right in the figures). However, superframe 450 may be divided into any suitable number of service intervals. This number is the maximum number of possible service intervals that may be activated in the superframe 450. Each service interval is associated with a duration defined by a fixed left boundary and a fixed right boundary, such as a service interval $SI_3$ 408 which is shown to include a fixed left boundary 410 and a fixed right boundary 412. In the present example, superframe 450 has a duration of 100 milliseconds (ms), and therefore each service interval has a duration of 12.5 ms; thus, the minimum delay bound that can be met by the AP is 12.5 ms.

Upon power up or initialization of the AP, or when the traffic requirement is at a minimum, the AP activates no more than a single service interval, which may be referred to as an initial access period (IAP). The initial default status of each other N−1 service interval is set to "inactive", and the length or duration of the active subinterval of a deactivated SI is set to zero. Subsequently, the AP operates to dynamically activate additional SIs, and/or increase durations of active subintervals of a given SI, in order to accommodate newly-accepted traffic streams (TSs) or increased levels of best-effort traffic.

In FIG. 4, service interval $SI_1$ corresponding to the IAP is illustrated and defined by two subintervals, an active (communication) subinterval 420 having boundaries 422 and 424 (0 to 5 ms) and an inactive subinterval that follows it (bounded by the fixed right boundary of $SI_1$). During any inactive subinterval, the AP may place itself in the power conservation mode. An end station may contend for channel access during the IAP to request the admission of a real-time traffic stream. If the new traffic stream is accepted, the AP may activate additional SIs and adjust their durations in order to meet the requirements for the admitted traffic stream. Once a traffic stream is accepted, the AP instructs the corresponding end station to contend for channel access in a specific set of activated SIs that meet the requirements of the traffic stream. In some cases, for example, communications may be performed in accordance with Automatic Power Save Delivery (US-APSD). Active end stations are permitted to access only those activated SIs that are either assigned to them by the AP, or are randomly-selected by best-effort stations after associating with the AP.

FIGS. 5-9 are further representations of superframe 450 of FIG. 4 for explaining the AP's dynamic activation/deactivation of SIs, each figure being a snapshot in time where the traffic requirement of end stations has changed. In a timeline 500 of FIG. 5, the initial interval $SI_1$ is provided with a changed (increased) duration that is changed (increased) from the initial duration in accordance with a change (increase) in a traffic requirement of the end stations being served by the AP. Specifically, the AP sets an active subinterval 520 of $SI_1$ to have an increased duration as defined by boundaries 522 and 524 (0 to 7 ms), and sets all other service intervals 530 as inactive for AP power conservation.

Figure 6:
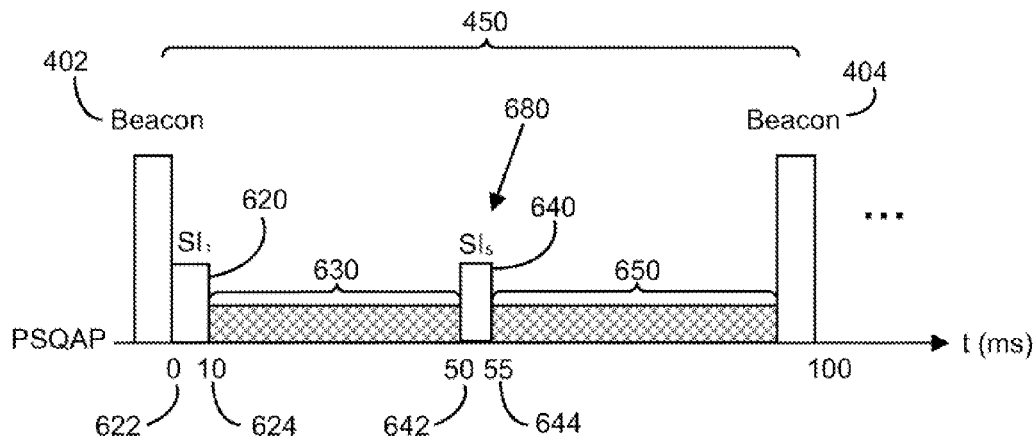
FIG. 6 is an illustrative representation of the superframe of FIG. 5, where the number of activated service intervals is changed (increased) to two (2) activated service intervals in accordance with a change (increase) in traffic requirement for mobile devices being served by the AP, as well as to meet time delay limits on traffic delivery.

In a timeline 600 of FIG. 6, the number of activated service intervals 680 is changed (increased) to two (2) activated service intervals ($SI_1$ and $SI_5$) in accordance with a change (increase) in the traffic requirement. Specifically, the AP sets an active subinterval 620 of $SI_1$ to have an increased duration as defined by boundaries 622 and 624 (0 to 10 ms), activates a new service interval $SI_5$ having an active subinterval 740 with a duration defined by boundaries 642 and 644 (50 to 55 ms), and sets all other interleaved service intervals 630 and 650 as inactive for AP power conservation.

Figure 7:
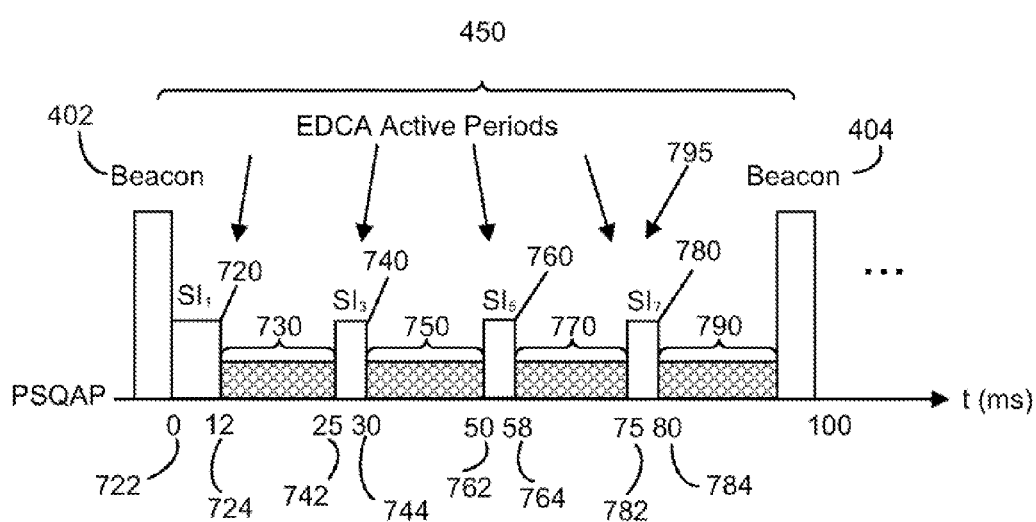
FIG. 7 is an illustrative representation of the superframe of FIG. 6, where the number of activated service intervals is changed (increased) to four (4) activated service intervals in accordance with a change (increase) in traffic requirement for mobile devices being served by the AP, as well as to meet time delay limits on traffic delivery.

In a timeline 700 of FIG. 7, the number of activated service intervals 795 is changed (increased) to four (4) service intervals ($SI_1$, $SI_3$, $SI_5$, and $SI_7$) in accordance with a change (increase) in traffic requirement. Specifically, the AP sets an active subinterval 720 of $SI_1$ to have an increased duration as defined by boundaries 722 and 724 (0 to 12 ms), activates a new service interval $SI_3$ with an active subinterval 740 having a duration as defined by boundaries 742 and 744 (25 to 30 ms), sets a duration of an active subinterval 760 of $SI_5$ to have an increased duration as defined by boundaries 762 and 764 (50 to 58 ms), activates a new service interval $SI_7$ having an active subinterval 780 with a duration as defined by boundaries 782 and 784 (75 to 80 ms), and sets all other interleaved service intervals 730, 750, 770, and 790 as inactive for AP power conservation.

Figure 8:
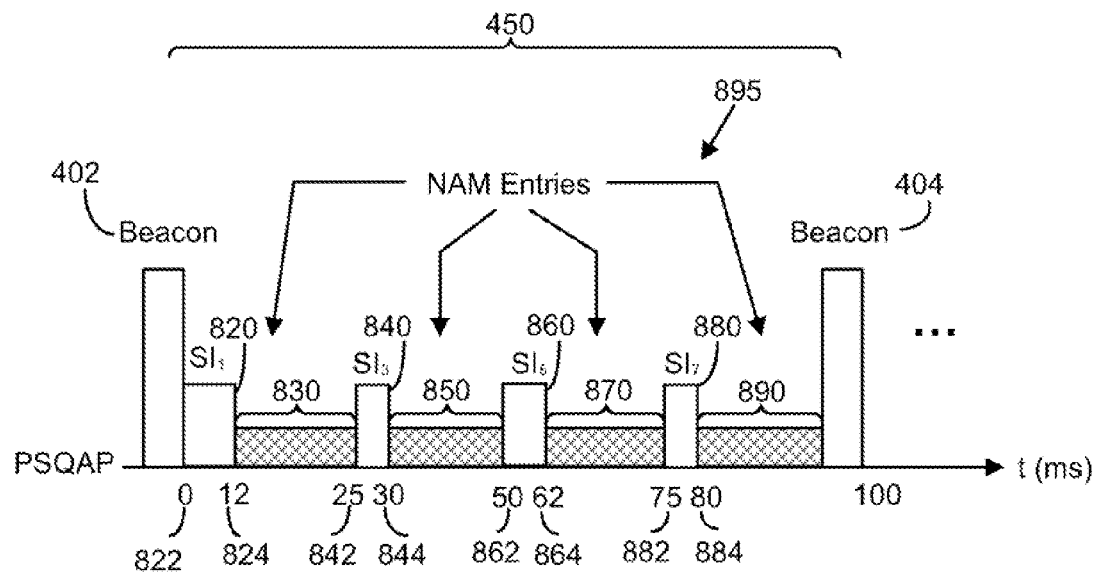
FIG. 8 is an illustrative representation of the superframe of FIG. 7, where an active subinterval of one of the four (4) activated service intervals is provided with a changed (increased) duration that is changed (increased) from its initial duration in accordance with a change (increase) in traffic requirement of the mobile devices being served by the AP.

In a timeline 800 of FIG. 8, one of the four (4) active service intervals 895 (i.e. $SI_5$) is provided with a changed (increased) duration that is changed (increased) from its initial duration in accordance with a change (increase) in the traffic requirement. Specifically, the AP keeps an activated service interval $SI_1$ having an active subinterval 820 with the duration as defined by boundaries 822 and 824 (0 to 12 ms), keeps an activated service interval $SI_3$ having an active subinterval 840 with a duration as defined by boundaries 842 and 844 (25 to 30 ms), sets an active subinterval 860 of $SI_5$ to have an increased duration as defined by boundaries 862 and 864 (50 to 62 ms), keeps an activated service interval $SI_7$ having an active subinterval 880 with a duration as defined by boundaries 882 and 884 (75 to 80 ms), and keeps all other interleaved service intervals 830, 850, 870, and 890 as inactive for AP power conservation.

Figure 9:
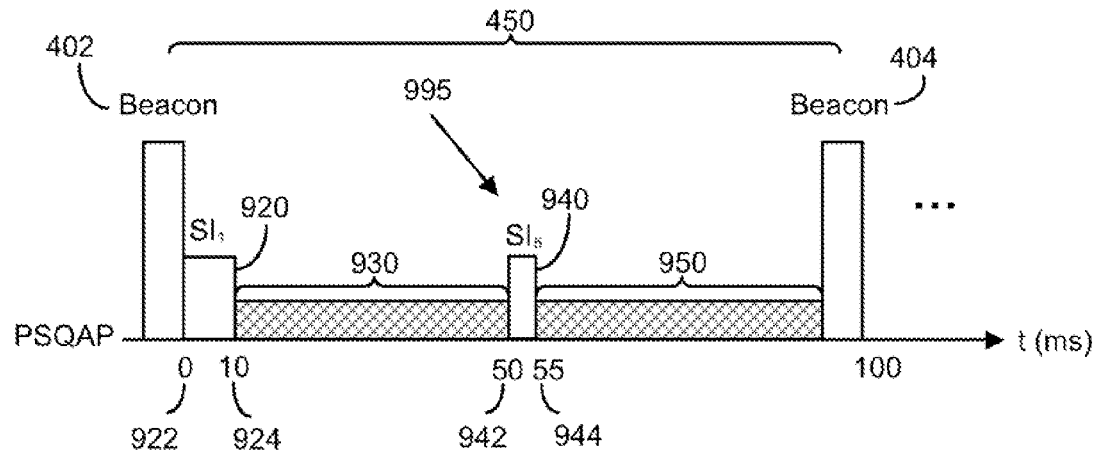
FIG. 9 is an illustrative representation of the superframe of FIG. 8, where the number of activated service intervals is changed (decreased) to two (2) activated service intervals, and the durations of their active subintervals are changed (decreased), in accordance with a change (decrease) in traffic requirement for mobile devices being served by the AP.

Finally, in a timeline 900 of FIG. 9, the number of activated service intervals 995 is changed (decreased) back to two (2) activated service intervals ($SI_1$ and $SI_5$), and the durations of the active subintervals are changed (decreased), in accordance with a change (decrease) in the traffic requirement. Specifically, the AP sets an active subinterval 920 of $SI_1$ to have a decreased duration as defined by boundaries 922 and 924 (0 to 10 ms), sets an active subinterval 940 of $SI_5$ to have a duration as defined by boundaries 942 and 944 (50 to 55 ms), and sets all other interleaved service intervals 930 and 950 as inactive for AP power conservation.

Figure 5:
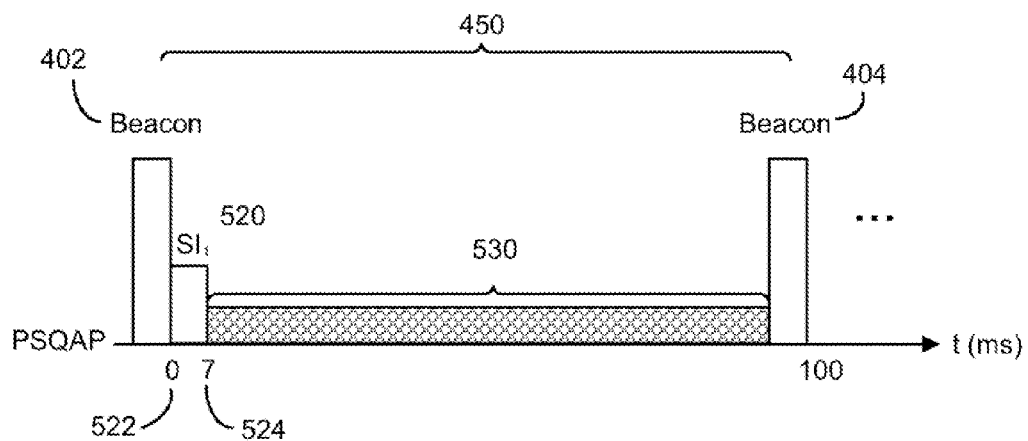
FIG. 5 is an illustrative representation of the superframe of FIG. 4, where the active subinterval of the activated service interval is provided with a changed (increased) duration that is changed (increased) in accordance with a change (increase) in traffic requirement of the mobile devices being served by the AP.

An exemplary explanation is now provided in relation to the activations and deactivations of the SIs of FIGS. 4-9. End stations may be or be referred to as "QoS" end stations or QSTAs. Referring back to FIG. 4, the AP (or "QAP") is initialized and sets the initial service interval $SI_1$ to be active, but all other service intervals to be inactive. The AP sets the active subinterval of service interval $SI_1$ to 5 ms, which leaves the remainder of the service interval (i.e. the inactive subinterval) for AP power savings. Next, a new "best-effort" station $QSTA_1$ associates with the AP and transmits during activated service interval $SI_1$. In response, the AP extends the admissible part of $SI_1$ as shown in FIG. 5, and regularly advertises the activated service interval and its duration/boundaries in the NAM for other end stations that may desire access.

Next, an end station $QSTA_2$ having a new real-time traffic stream with a 50 ms delay bound is added. As a result, the AP adjusts the duration of the active subinterval of $SI_1$ and activates service interval $SI_5$ as shown in FIG. 6. Again, the AP regularly advertises the updated activated service intervals and associated durations/boundaries in the NAM for other end stations that may desire access. Note that the updated set of activated SIs in FIG. 6 is a super-group of that in FIG. 5. Further note that the schedule of end station $QSTA_1$ is not affected by the admission of $QSTA_2$.

Subsequently, a new end station $QSTA_3$ having a real-time traffic stream with a 25 ms delay bound is added. To meet this bound, the AP activates both service intervals $SI_3$ and $SI_7$ as revealed in FIG. 7. Note that the new set of active periods is a super-group of that shown in FIG. 6. The service schedule for both end stations $QSTA_1$ and $QSTA_2$ are not affected. Subsequently, a "best-effort" end station $QSTA_4$ joins the BSS. As part of the association signaling with $QSTA_4$, the AP sends which indicates the activated service intervals $SI_1$ and $SI_5$ to $QSTA_4$. In response, $QSTA_4$ arbitrarily selects activated service interval $SI_5$ for communications, and $QSTA_4$ will confine its packet transmissions to $SI_5$. The AP causes the right boundary of service interval $SI_5$ to be shifted to the right. The AP also causes the NAM to be updated to include the updated set of activated service intervals and durations/boundaries. After $QSTA_3$ terminates its traffic stream (FIG. 9), and no other stations are assigned to $SI_3$ or $SI_7$, the AP deactivates both of these service intervals as shown in FIG. 9. The AP updates the NAM to include the updated set of activated service intervals and associated durations. End stations $QSTA_1$, $QSTA_2$, and $QSTA_4$ are not affected by the NAM update.

As apparent, the selective activation and deactivation of SIs as described is performed such that each new set of activated SIs will be either a super-group or a sub-group of the old set. This feature provides the advantage of reducing the signaling required to update active end stations. However, when the channel utilization in a given active SI becomes very low, it is advantageous for the AP to deactivate this SI in order to conserve energy. In this case, the AP will signal all affected end stations so that they are assigned to other activated SIs in the superframe. In another embodiment, this super-group and sub-group feature is not provided.

Note also that there may be practical limits on the durations of the SIs that can be used. This may be determined by considering the power consumed by the wireless transceiver during the ramp-up (doze-to-awake) and ramp-down (awake-to-doze) periods. The potential sleep time for an AP (per SI) may be calculated as $$T_{(PER\ SI\ SLEEP)} = t_{SI} - t_A - t_{WAKE-UP} - t_{WAKE-DOWN}$$

where $t_A$ is the length of the active subinterval, $t_A/t_{SI} = \alpha$, where $1 \geq \alpha \geq 0$, and $t_{WAKE-UP}$ and $t_{WAKE-DOWN}$ are the time spent by the wireless transceiver during the ramp-up and ramp-down, respectively. The power consumption for the AP during an active subinterval is $$\eta_{Tx} t_{DL}/t_A + \eta_{Rx} t_{UL}/t_A$$

where $\eta_{Tx}$, $\eta_{Rx}$, and $\eta_D$ are the assumed power dissipation in transmit, receive, and sleep (doze) modes, respectively, and $t_{UL}$ and $t_{DL}$ are the fractions of the active subinterval spent in receiving uplink and transmitting downlink traffic from/to end stations, respectively.

An analysis of AP power consumption reveals that, for a coarse-grained $t_{SI}$ ($\simeq$ 20 ms), the percentage of wasted channel time ranges from 5% to 15%, while it is in the range of 10% to 30% of $t_{SI}$ when a fine-grained $t_{SI}$ of length 10 ms is used. For both cases, high power consumption is due to turning oscillators of the wireless transceiver off during the power conservation interval. Modern chipsets may keep the oscillators running while the wireless transceiver is off, at the cost of dissipating extra power (e.g. $\simeq$ 6 mW compared to 2 mW). This also suggests that a lightly-loaded AP (e.g. 15% duty-cycle) may achieve additional energy savings by turning off the oscillators during the power conservation interval. On the other hand, it is a more energy-efficient choice for a loaded AP with 50% duty cycle to keep the oscillators running during the power conservation interval. The reason for this is that the energy savings due to shorter wake-up times would be larger than the energy savings during the power conservation interval if the oscillators are turned off.

In one embodiment, the AP is adapted to set a minimum duration for power savings. The minimum duration for the power conservation may be applied per service interval or per superframe. In such technique, if the AP calculates or otherwise identifies that it is near or at a predetermined limit of service (e.g. 85%), and receives further communication requests from end stations, it may deny the new requests, or limit or reduce the QoS for one or more of the end stations. The minimum duration for power savings may be within a range of 50-90%, for example, but may be any suitable range. In a particular embodiment relating to the relationships provided above, the AP may set $t_A = \alpha t_{SI}$, where the non-negative design parameter is $\alpha < 1.0$, so that the AP may use $(1-\alpha)t_{SI}$ as minimum sleep time.

Figure 10:
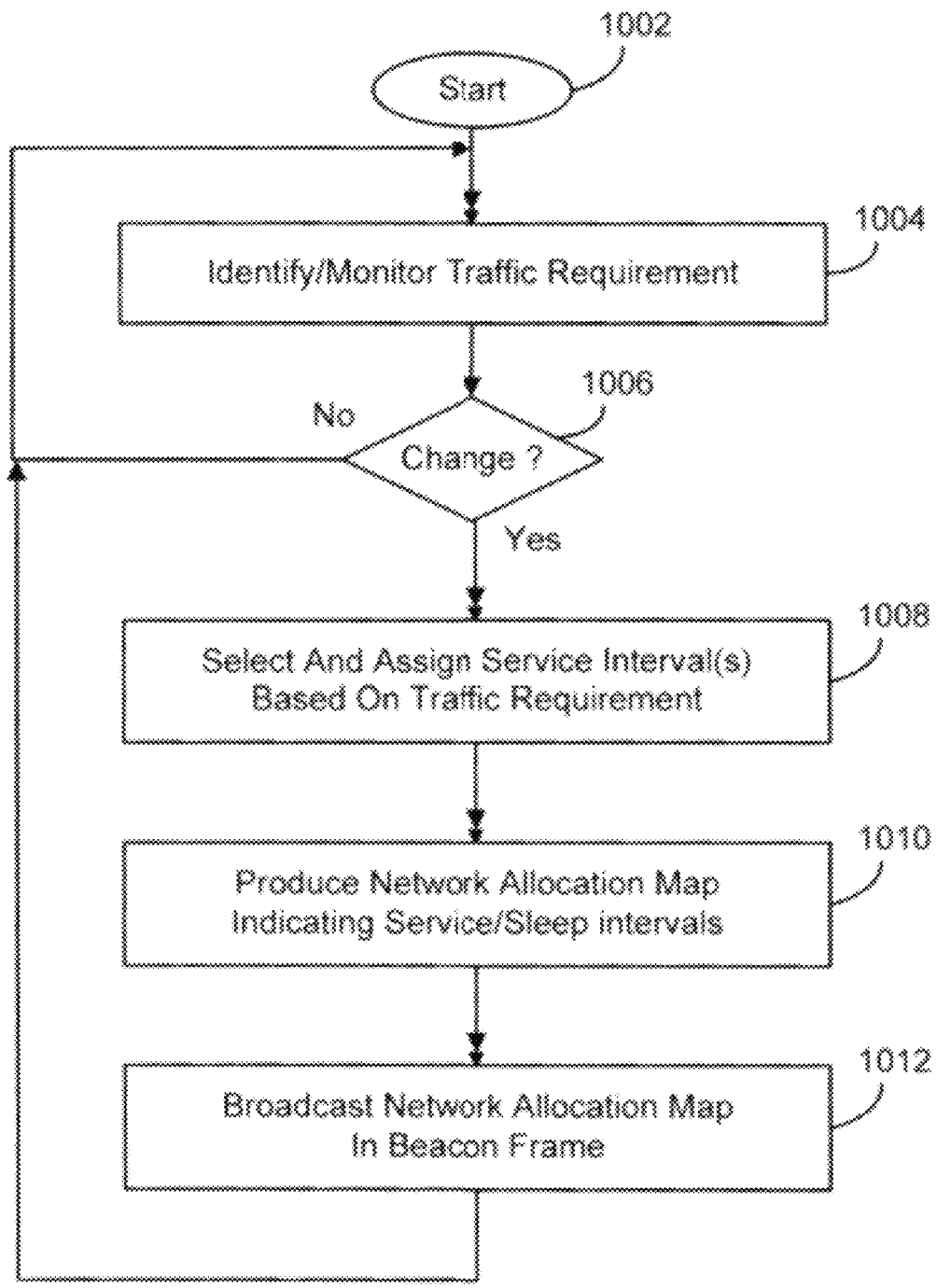
FIGS. 10-11 are flowcharts which describe methods of providing operation of the AP for reduced power consumption.
Figure 11:
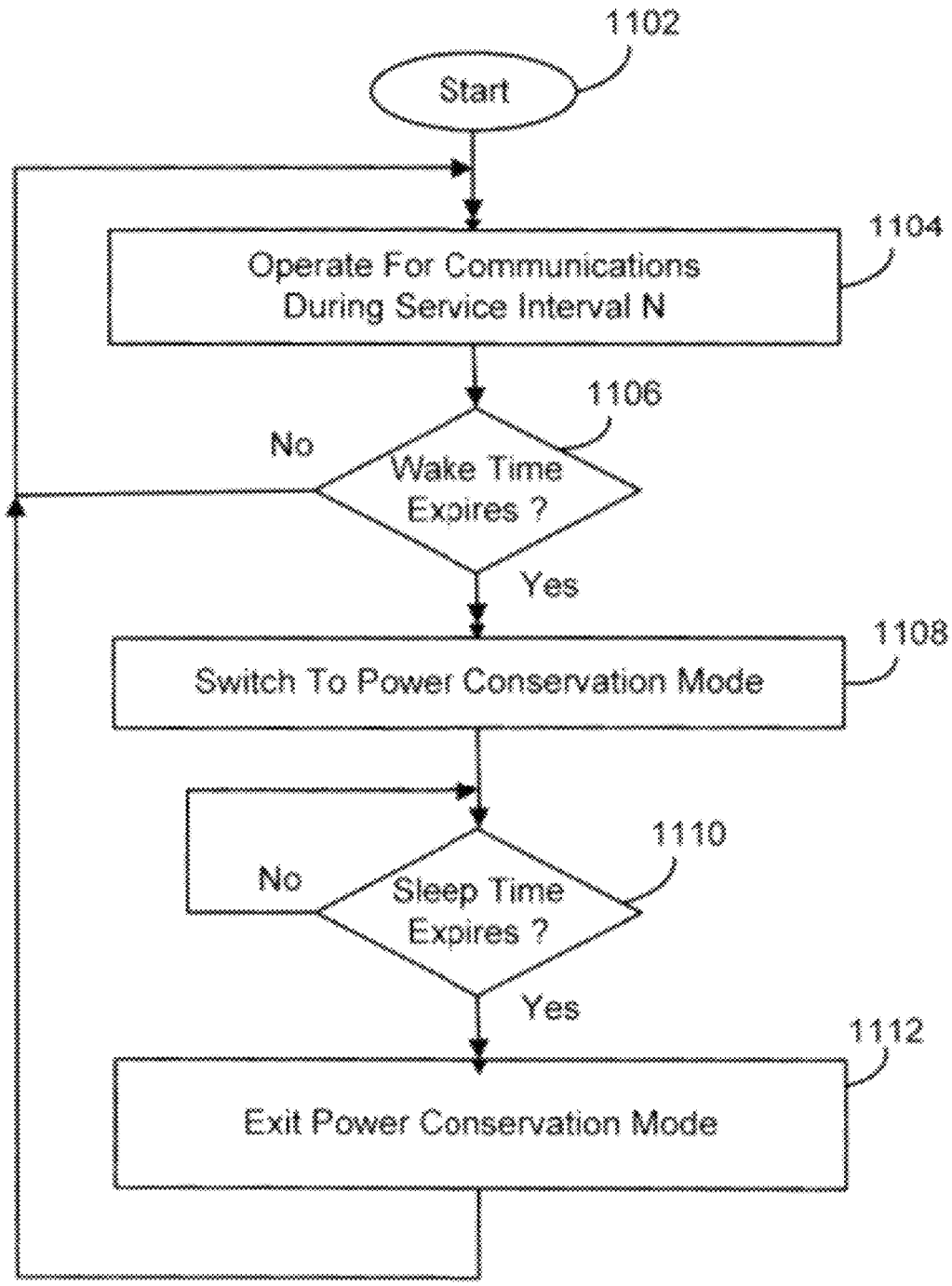
Figure 12:
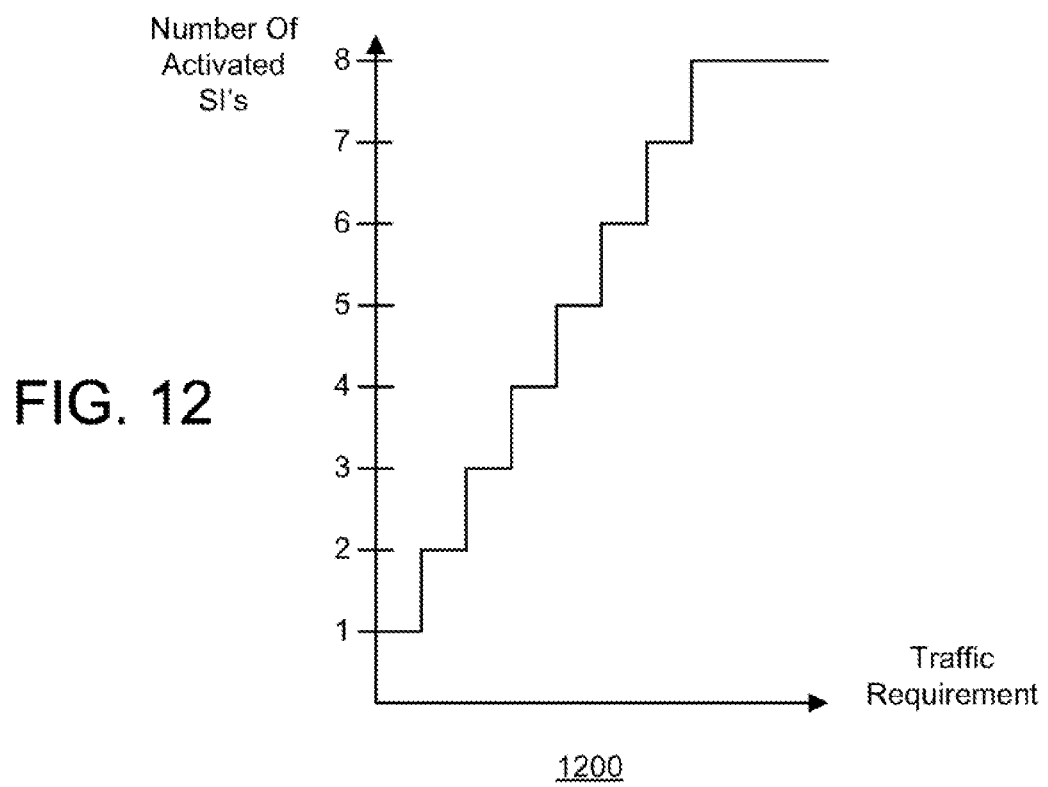
FIGS. 12-13 are graphs which show an example of how the number of active service intervals, and their durations, may change in accordance with the change in the traffic requirement.
Figure 13:
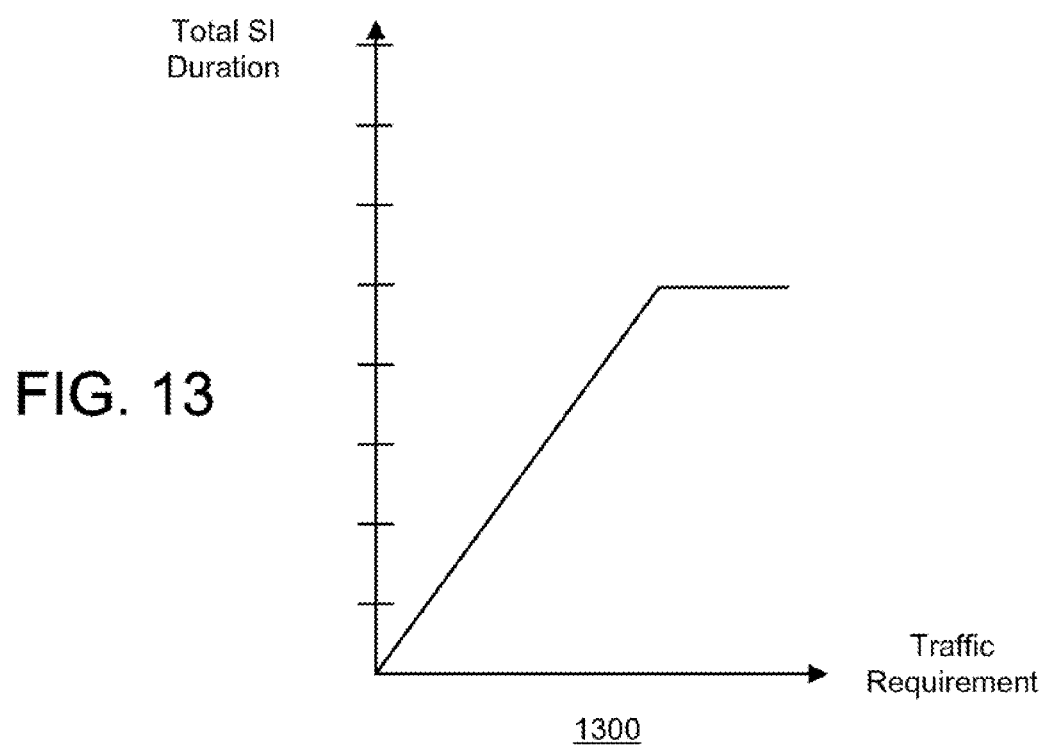

FIGS. 10-11 are flowcharts which describe a general method of providing operation for a wireless AP (e.g. wireless AP 106 of FIGS. 1 and 3) using dynamically-activated service intervals in accordance with the present disclosure. This exemplary operation may utilize the framing structure shown and described earlier in relation to FIGS. 4-9, or other suitable or similar structure.

The method of FIGS. 10-11 may be embodied in an AP of the present disclosure with computer instructions which are executed by one or more processors of the AP. A computer program product of the present disclosure includes computer-readable memory having computer instructions which are executable by one or more processors for performing the described method. Note further that an end station employs a corresponding method related to that shown and described in relation to FIGS. 10-11 using its one or more processors.

FIG. 10 is described first, where the AP operates to provide communications for end stations during one or more activated service intervals of each superframe, and to place itself into a power conservation mode during one or more deactivated service intervals where it is unavailable to provide communications for the end stations. At least some of the activated service intervals (or portions thereof) are provided for contention-based or polling-based communication access for all associated end stations (e.g. for requesting and receiving web/HTML data). Also, some of the activated service intervals (or portions thereof) may be assigned exclusively to an end station (e.g. for traffic streams such as voice communications or VoIP).

Beginning with a start block 1002 of FIG. 10, the AP identifies or monitors the current traffic requirement for communications for one or more end stations associated with the AP (step 1004 of FIG. 10). During operation, the AP may regularly receive and detect new communication requests and traffic from end stations, as well as regularly lose and detect the loss of communications and traffic from end stations, in the identification of the traffic requirement. The identification of the traffic requirement may be or include an identification of the Quality of Service (QoS) requirement or expectation for the one or more end stations. In one embodiment, the AP may receive and examine data in Traffic Specifications (TSPECs) from the end stations for identifying or determining the traffic requirement. Each TSPEC may contain a set of parameters, characteristics, or QoS expectations of the traffic stream, or combinations of the above.

If there is no identified change in the traffic requirement (step 1006 of FIG. 10), then the AP continues to monitor the traffic requirement in step 1004. If there is an identified change in the traffic requirement in step 1006, then the AP selects and assigns ("activates" or "deactivates") one or more service intervals based on the traffic requirement (step 1008 of FIG. 10). The AP changes the number of activated service intervals that are available to end stations for contention-based or polling-based communication access in accordance with the change in traffic requirements.

The number of activated service intervals may be based on a predefined relationship with the traffic requirement where, as the traffic requirement increases, the number of activated service intervals increases (or correspondingly decreases as the traffic requirement decreases). For example, the number of activated service intervals may be (directly) proportional to the traffic requirement. See e.g. a graph 1200 of FIG. 12, where the number of activated service intervals increases in a step-wise fashion in accordance with the increasing traffic requirement. Further, the duration of one or more activated service intervals may be based on a predefined relationship with the traffic requirement where, as the traffic requirement increases, the duration of the one or more activated service intervals increases (or correspondingly decreases as the traffic requirement decreases). See e.g. a graph 1300 of FIG. 13, where the total duration of the activated service intervals increases in accordance with increasing traffic requirement. Viewing it the other way, the number of deactivated service intervals may be determined of based on a predefined relationship with the traffic requirement where, as the traffic requirement increases, the number of deactivated (power saving) intervals correspondingly decreases (or correspondingly increases as the offered capacity decreases). For example, the number of deactivated (power saving) service intervals may be negatively proportional to the traffic requirement. Note that, the number of activated service intervals may be determined directly from the traffic requirement, or indirectly from the determined number of deactivated service intervals. Similarly, the number of deactivated service intervals may be determined directly from the traffic requirement or indirectly from the determined number of service intervals.

Next, the AP produces and then transmits data to the end stations which indicate the activated service intervals that are made available to the end stations for communication access. The data which indicate the activated service intervals may do so directly by listing the service intervals by identifiers (see e.g. FIG. 4) associated with the service intervals, by duration or boundary indications of the service intervals (see e.g. FIG. 4), or both, or by other suitable indications. On the other hand, the data which indicate the service internals may do so indirectly by listing the deactivated (power conservation) service intervals by identifiers, or duration or boundary indications, or both, or by other suitable indications. In one embodiment, these data are broadcasted in a beacon frame to the end stations. In particular, these data may be provided in a Network Allocation Map (NAM) which indicates the current activated or deactivated service intervals (step 1010 of FIG. 10). The NAM is then broadcasted in the beacon frame (step 1012 of FIG. 10). In other variations, the data may be transmitted in another suitable broadcast, multicast, or unicast frame or message. The method continually repeats during operation of the AP.

The method of FIG. 11 is now described, which may be executed in parallel with the method of claim 10. Beginning with a start block 1102 of FIG. 11, the AP operates for communications with one or more end stations during an activated service interval n (step 1104 of FIG. 11). The AP is "awake" and its wireless transceiver is powered up and active. The activated service interval is provided for contention-based or polling-based communication access for all associated end stations (e.g. for requesting and receiving web/HTML data). The contention-based communication access may be an Enhanced Distributed Channel Access (EDCA), and the polling-based communication access may be a Hybrid Coordinator Function (HCF) Controlled Channel Access (HCCA), as examples. The activated service intervals (or a portion thereof) may alternatively be assigned exclusively to an end station (e.g. for traffic streams such as voice communications or VoIP).

At the beginning of the AP's active wake time, the AP sets and runs a wake timer. If the AP's wake timer has not yet expired (step 1106 of FIG. 11), the AP continues to operate for communications for the end stations during the service interval n. If the wake time is identified by the AP to have expired (step 1106 of FIG. 11), then the activated service interval has ended and a deactivated service interval (or "power conservation" interval) has begun. In response, the AP places itself in a power conservation mode (step 1108 of FIG. 11), which may be referred to as a sleep mode or doze mode.

In the power conservation mode of the AP, its wireless transceiver and other suitable subsystems (e.g. associated processors) are switched into a lower power conserving state. For example, the wireless transceiver and/or one or more processors/controllers of the AP (see e.g. FIG. 3) may be powered down entirely, or in part, in the power conservation mode. The AP is not enabled for communications with end stations in the power conservation mode. During this interval, all end stations must refrain from communicating through the wireless access point. During the power conservation mode, all end stations may block their Network Allocation Vectors (NAVs) and refrain from accessing the channel until the NAV is reset at the beginning of the next (EDCA) activity interval.

At the beginning of the deactivated service interval, the AP sets and runs a sleep timer, which is monitored for its expiration (step 1110 of FIG. 11). If the AP's sleep timer has not yet expired in step 1110, the AP continues to sleep in the power conservation mode. If the sleep timer is identified by the AP to have expired in step 1110, then the AP exits the power conservation mode (step 1112 of FIG. 11) to continually repeat the process at step 1104. For the wake state of the AP, its wireless transceiver and other suitable subsystems (e.g. associated processors) are switched on for proper operation. For example, the wireless transceiver and/or one or more processors/controllers of the AP may be powered up.

As apparent, the number of activated service intervals and/or the duration of active subintervals are changed by the AP during its operation (e.g. by one or more processors of the AP regularly when needed). If a change in the traffic requirement (e.g. based on QoS, TSPECs) is detected by the wireless access point during operation, then a new number of activated service intervals is determined or selected, and new durations for these service intervals may be determined as well. The number of service intervals is determined to satisfy the minimum traffic requirement for which to facilitate communications for the end stations currently being served. The power conservation duration is therefore maximized or optimized for optimized power savings given the minimum capacity requirement.

Thus, methods and apparatus for controlling a QoS-enabled wireless access point (AP) (e.g. a battery-powered wireless "QAP") for reduced power consumption have been described herein. The AP is adapted to provide contention-based or polling-based communication access (e.g. IEEE 802.11e EDCA and/or HCCA) for mobile communication devices in one or more service intervals in each superframe. During operation, the AP changes the number of activated service intervals that are available to end stations for the contention-based or polling-based communication access, as well as durations of active subintervals therein, in accordance with a change in traffic requirements. The AP regularly broadcasts data which indicates the activated service intervals that are made available to the end stations. A wireless transceiver of the AP is enabled during each activated service interval made available to the end stations, but the AP may be placed in a power conservation mode during each power conservation interval provided in between the activated service intervals. The AP may also be placed in the power conservation mode during inactive subintervals of each activated service interval.

Thus, the present techniques allow power savings in the APs while preserving the QoS requirements of real-time applications. Thus, power consumption is APs can be greatly reduced while maintaining user QoS requirements and without significantly affecting power savings in the end stations.

The above-described embodiments of the present disclosure are intended to be examples only. Those of skill in the art may affect alterations, modifications and variations to the particular embodiments without departing from the scope of the application. Although the description of the architecture relates to an IEEE 802.11-based network, different environments may be applicable as well. The wireless network may be a WiMAX-based network (i.e. IEEE 802.16), an Ultra-WideBand (UWB)-based network (i.e. IEEE 802.15), a Bluetooth-based network, or any suitable wireless broadband network, as a few examples. The invention described herein in the recited claims intends to cover and embrace all suitable changes in technology.

The invention claimed is:

1. A method for use in controlling a wireless access point configured to provide contention-based communication access for communication devices during a plurality of dynamically-activated service intervals in each one of a plurality of superframes, the method comprising:
   in response to a change in a traffic requirement for communication devices operating via the wireless access point: changing, in accordance with the change in the traffic requirement, the number of activated service intervals in the superframe that are available to the communication devices for the contention-based communication access;
   transmitting, to the communication devices, data which identify the activated service intervals in the superframe that are made available to the communication devices for the contention-based communication access;
   causing a wireless transceiver of the wireless access point to be enabled for the contention-based communication access during each said activated service interval; and
   causing the wireless access point to be placed into a power conservation mode during each power conservation interval provided in between said activated service intervals.

2. The method of claim 1, wherein the number of activated service intervals has a relationship with the traffic requirement such that as the traffic requirement increases, the number of service intervals increase.

3. The method of claim 1, further comprising:
   causing the wireless transceiver to be enabled for the contention-based communication access during an active subinterval of said activated service interval; and
   causing the wireless transceiver to be placed into the power conservation mode during an inactive subinterval of said activated service interval.

4. The method of claim 1, further comprising:
   in response to the change in traffic requirement: changing, in accordance with the change in the traffic requirement, the duration of at least one active subinterval of an activated service interval for the contention-based communication access, the duration having a relationship with the traffic requirement such that as the traffic requirement increases, the duration of the at least one service interval increases.

5. The method of claim 1, wherein the contention-based communication access is based on Enhanced Distributed Channel Access (EDCA).

6. The method of claim 1, wherein the act of transmitting comprises the further act of broadcasting identifiers of the activated service intervals that are available to the communication devices for the contention-based communication access.

7. The method of claim 1, wherein the act of transmitting comprises the further act of broadcasting data indicative of boundaries or durations of the activated service intervals that are available to the communication devices for the contention-based communication access.

8. The method of claim 1, further comprising:
   receiving, from one of the communication devices, a traffic specification (TSPEC); and
   identifying the change in the traffic requirement based on data in the traffic specification.

9. The method of claim 1, further comprising:
   receiving, from one of the communication devices, a request for communications; and
   assigning one or more service intervals exclusively for the communications of the communication device.

10. The method of claim 1, wherein the contention-based communication access is based on Hybrid Coordinator Function (HCF) Controlled Channel Access (HCCA).

11. The method of claim 1, which is performed by computer instructions stored in a non-transitory computer readable medium and executable on one or more processors of the wireless access point.

12. A wireless access point, comprising:
at least one wireless transceiver;
an antenna coupled to the at least one wireless transceiver;
one or more processors coupled to the at least one wireless transceiver;
the one or more processors being configured to operate with the wireless transceiver to:
provide contention-based communication access for communication devices in a plurality of dynamically-activated service intervals in each one of a plurality of superframes;
in response to a change in a traffic requirement for the communication devices operating via the wireless access point: change, in accordance with the change in the traffic requirement, the number of said activated service intervals in the superframe that are available to the communication devices for the contention-based communication access;
broadcast, to the communication devices, data which identify the activated service intervals in the superframe that are made available to the communication devices for the contention-based communication access;
causing the wireless transceiver to be enabled for the contention-based communication access during each said activated service interval; and
causing the wireless access point to be placed into a power conservation mode during each power conservation interval provided in between said activated service intervals.

13. The wireless access point of claim 12, wherein the number of activated service intervals has a relationship with the traffic requirement such that as the traffic requirement increases, the number of service intervals increase.

14. The wireless access point of claim 12, wherein the one or more processors are further configured to:
in response to the change in traffic requirement: change, in accordance with the change in the traffic requirement, the duration of at least one active subinterval of an activated service interval for the contention-based communication access, the duration having a relationship with the traffic requirement such that as the traffic requirement increases, the duration of the at least one service interval increases.

15. The wireless access point of claim 12, wherein the one or more processors are further configured to broadcast identifiers of the service intervals that are available to the communication devices for the contention-based communication access.

16. The wireless access point of claim 12, wherein the one or more processors are further configured to broadcast data indicative of boundaries or durations of the activated service intervals that are available to the mobile devices for the contention-based communication access.

17. The wireless access point of claim 12, wherein the one or more processors are further configured to:
receive, from one of the communication devices, a traffic specification; and
identify the change in the traffic requirement based on data in the traffic specification.

18. The wireless access point of claim 12, further comprising:
a battery power interface configured for coupling to a battery power source for supplying electrical power to electrical components of the wireless access point, the electrical components including the wireless transceiver and the one or more processors.

19. The wireless access point of claim 12, which is further configured to connect with and be part of a wireless local area network (WLAN) and operates in accordance with IEEE 802.11.

* * * * *

UNITED STATES PATENT AND TRADEMARK OFFICE
CERTIFICATE OF CORRECTION

PATENT NO. : 8,194,576 B2
APPLICATION NO. : 12/412591
DATED : June 5, 2012
INVENTOR(S) : Kholaif et al.

It is certified that error appears in the above-identified patent and that said Letters Patent is hereby corrected as shown below:

Title Page
In Section 73, please change "Research in Motion Limited, Waterloo Ontario, (CA)" to
--McMaster University, Hamilton, Ontario, (CA)--

Signed and Sealed this
Ninth Day of April, 2013

Teresa Stanek Rea
*Acting Director of the United States Patent and Trademark Office*